United States Patent [19]

Saito et al.

[11] Patent Number: 4,481,534
[45] Date of Patent: Nov. 6, 1984

[54] CONFIGURATION DETECTING DEVICE

[75] Inventors: Toyokazu Saito; Seietsu Sanmiya; Akio Hosooka, all of Aichi; Kazuo Takashima; Minoru Tanaka, both of Hyogo, all of Japan

[73] Assignees: Mitsubishi Denki Kabushiki Kaisha; Nippon Steel Corporation, both of Japan

[21] Appl. No.: 372,354

[22] Filed: Apr. 27, 1982

[30] Foreign Application Priority Data

Apr. 29, 1981 [JP] Japan .................................. 56-66037
Apr. 29, 1981 [JP] Japan .................................. 56-66038

[51] Int. Cl.³ .............................................. H04N 7/18
[52] U.S. Cl. ..................................... 358/107; 358/106
[58] Field of Search ................. 358/96, 100, 106, 107; 356/384, 385, 386; 364/563

[56] References Cited

U.S. PATENT DOCUMENTS

| 3,942,001 | 3/1976 | O'Connor | 250/223 B |
| 4,006,296 | 2/1977 | Peterson | 358/106 |
| 4,072,818 | 2/1978 | Couiello | 358/96 |
| 4,319,270 | 3/1982 | Kimura et al. | 358/100 |

Primary Examiner—Joseph A. Orsino, Jr.
Attorney, Agent, or Firm—Sughrue, Mion, Zinn, Macpeak, and Seas

[57] ABSTRACT

A device for detecting the configuration of a hot-rolled steel plate operates to sever an uneven front end from the main body thereof. The device includes sensors supplying a video signal of the plate and additional devices for differentiating, binarily encoding and otherwise processing the video signal to obtain a width signal which is used in controlling cutting.

13 Claims, 19 Drawing Figures

FIG. 6(a)
FIG. 6(b)
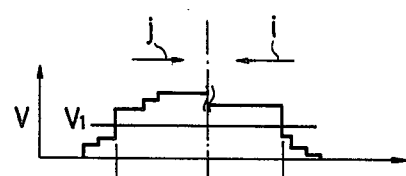
FIG. 6(c)
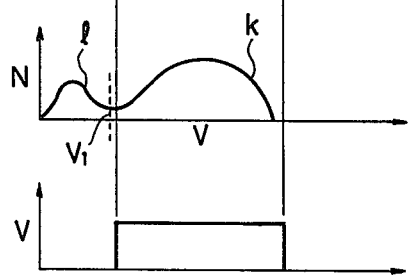
FIG. 6(d)

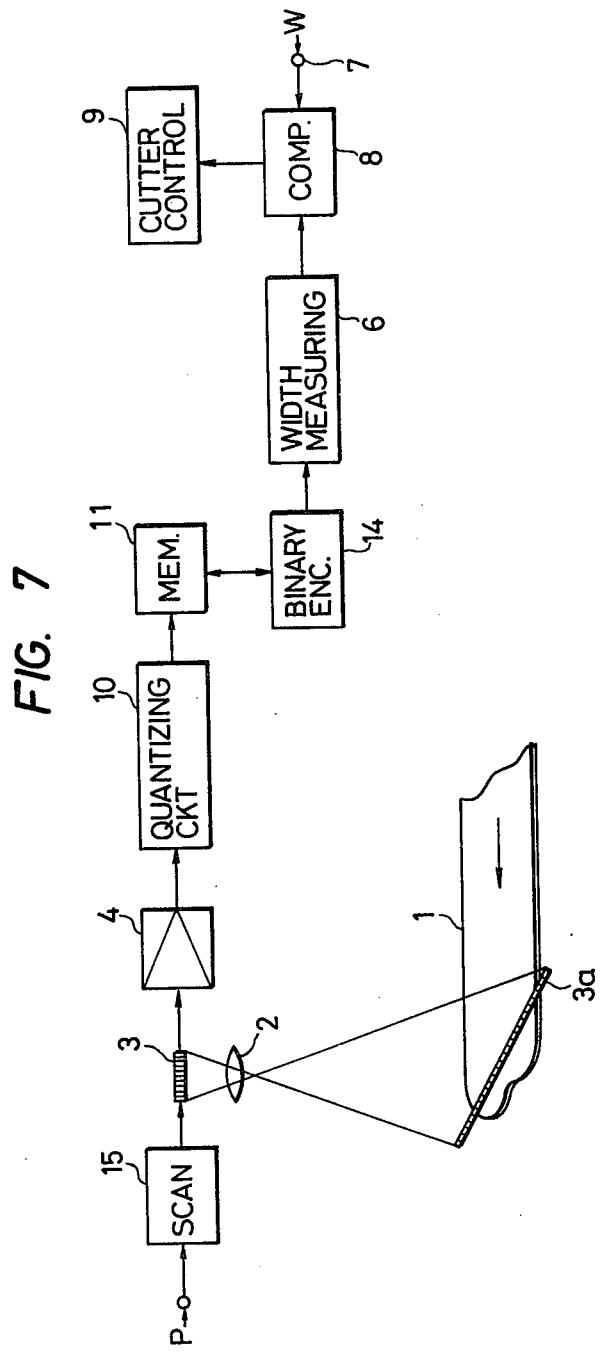

CONFIGURATION DETECTING DEVICE

BACKGROUND OF THE INVENTION

This invention relates to a configuration detecting device for detecting, the deformation of the front or rear end portion of a steel plate which is caused during rolling, for instance in a hot-rolling process.

The deformation of the front end portion of a steel plate in a hot-rolling process applies a non-uniform load on rolling rolls in succeeding stages, as a result of which these rolls may be damaged, or defective steel plates may be produced.

In order to overcome such drawbacks, heretofore, an operator has visually detected the deformation of the steel plate, and operated a cutter with suitable timing, to sever the deformed portion of the steel plate.

To eliminate this manual process, the following configuration detecting device has been proposed in the art, in which the deformation of the front end portion of a steel plate is automatically detected, the necessary but minimum amount of the deformed portion of the steel portion is cut off and the steel plate thus treated is delivered to the rolls of the next stage, so that the effect of the non-uniform load is eliminated and the rolls are protected from damage.

FIG. 1 is a block diagram showing the conventional configuration detecting device. The width of a red-hot steel plate 1 produced by a hot rolling process is measured at a measurement line 3a with an optical system using a lens 2 and a plurality of photo-electric elements 3 arranged in a line. The outputs of the photo-electric elements 3 are amplified by an amplifier 4, and are then converted into digital data by an A/D (analog-to-digital) conversion circuit 5. That is, the output signals of some of the photo-electric elements 3, on which the image of the steel plate 1 is formed, are set to a logical value "1", while output signals from the remaining photo-electric elements 3 on which the image of the steel plate 1 is not formed are set to a logical value "0". The output of the A/D conversion circuit 5 is applied to a width measuring circuit 6 comprising a counter circuit- so that the number of logical value "1" outputs is counted by the width measuring circuit 6, as a result of which a measurement value corresponding to the width of the steel plate 1 can be obtained.

The measurement value thus obtained is compared with a reference width value W applied through an input terminal 7 in a comparison circuit 8. When the steel plate width is within a predetermined value less than the value W, the comparison circuit 8 applies a cutting signal to a cutter controlling device 9, so that the front end portion of the steel plate 1 is cut off.

More specifically, a plate width kW (where W is the width of the central portion of the steel plate 1, and k is smaller than one (k<1)) of the front end portion of the steel plate, as indicated by the chain line, is detected, so that the front end portion is cut off, as shown in FIG. 2.

The conventional device is arranged as described above. Therefore, in the case where the image of the steel plate is not uniform in brightness because of wide temperature variations in the plate, or scales or water deposits formed on the steel plate, or if a region other than the image of the steel plate is made bright by heat or light which is scattered by particles in the background or in the air, the above device is liable to make errors in digitizing the image of the steel plate.

SUMMARY OF THE INVENTION

This invention has been developed to eliminate the above-described drawback accompanying a conventional configuration detecting device. An object of the invention is to provide a configuration detecting device in which an analog steel plate image signal is quantized in multiple levels and is stored in a memory, the quantized signal is subjected to spatial differentiation to obtain a steel plate signal in differentiation levels, and then binary encoding and peak hold processes are carried out, so that no errors are caused by signals corresponding to scales or water depositions or signals corresponding to scattered light.

A further object of the invention is to provide a configuration detecting device in which an analog steel plate signal is quantized in multiple levels and is stored in a memory, the steel plate signal is divided into a plurality of parts corresponding to positions on the steel plate, a temperature histogram is formed for every part to obtain an optimum threshold value, and a binary-encoding treatment is carried out using for the threshold value thus obtained, whereby the measurement is not affected by signals due to scattered light or the temperature distribution of the steel plate.

BRIEF DESCRIPTION OF THE DRAWINGS

FIGS. 6(a)-6(d) is a waveform diagram showing signals at various circuit elements in FIG. 5;

FIG. 7 is a block diagram showing the arrangement of a configuration detecting device according to a third embodiment of this invention.

DETAILED DESCRIPTION OF THE PREFERRED EMBODIMENTS

Figure 1:
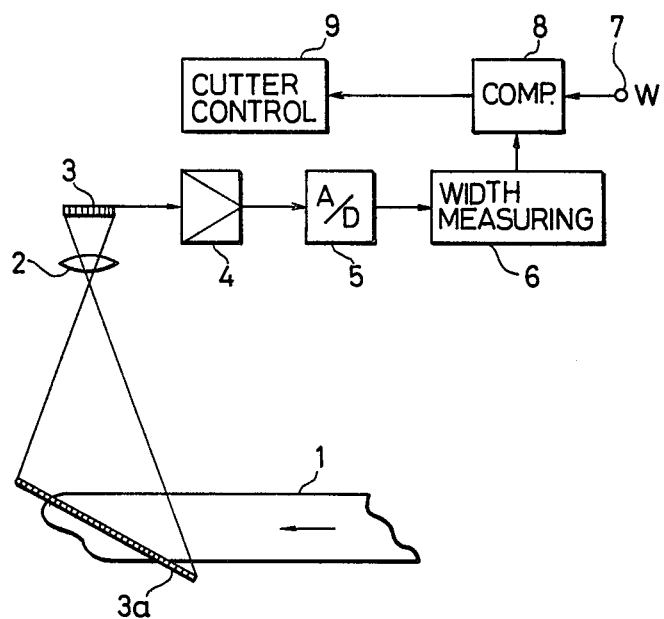
FIG. 1 is a block diagram showing the arrangement of a conventional configuration detecting device.
Figure 2:
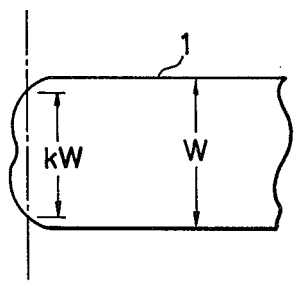
FIG. 2 is a diagram showing the front end portion of a steel plate, for use in describing the operation of the device in FIG. 1.
Figure 3:
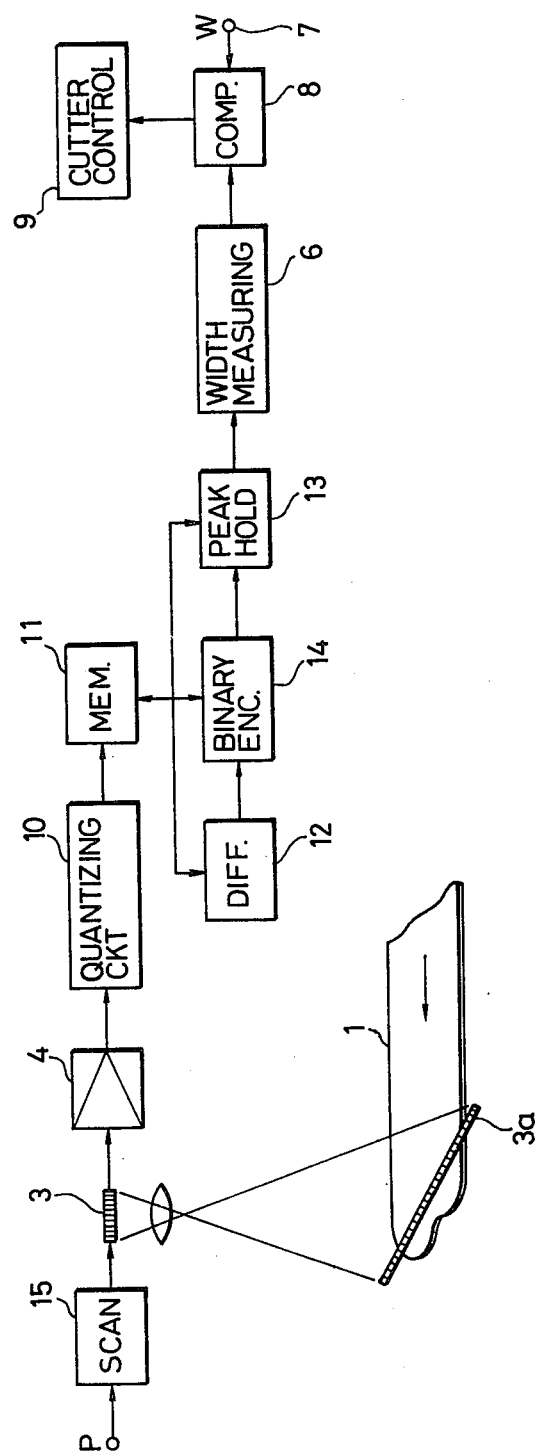
FIG. 3 is a block diagram showing the arrangement of a first embodiment of this invention.

In FIG. 3, reference numerals 1 through 9 designate elements designated by the same reference numerals in FIG. 1; 10 is a quantizing circuit for quantizing an analog steel plate image signal in multi-values; 11, a memory for storing a quantized steel plate image signal; 12, a differentiation circuit for reading the steel plate image signal stored in the memory 11 and two-dimensionally differentiating it; 14, a binary encoding circuit for binary-encoding the steel plate image signal thus differentiated with reference to a predetermined threshold value; 13, a peak hold circuit for detecting a peak value of the binary-coded signals and for holding the peak value; and 15, a scanning circuit for scanning a group of photo-electric elements 3a in response to a drive signal P which is applied whenever the steel plate is moved a predetermined distance in a detection region, to deliver the outputs of the photo-electric elements.

In the device thus organized, the outputs of the group of N-photo-electric elements 3 (hereinafter referred to as a video signal) are read out as the photo-electric elements are scanned whenever the steel plate moves a predetermined distance in the direction of the arrow through the field of vision extending laterally of the steel plate (in the width direction).

Figure 4A:
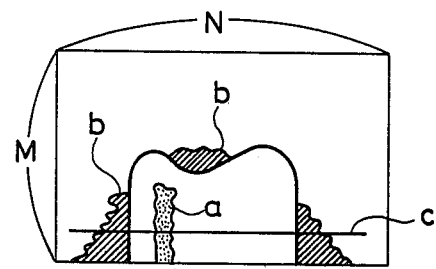
FIGS. 4(a)-4(e) is a waveform diagram showing signals at various circuit elements in FIG. 3.
Figure 4B:
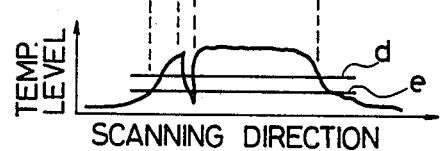

The video signal is applied through the amplifier 4 to the quantizing circuit 10, where it is converted into a digital signal with multiple-quantization-levels. The digital signal is stored in the memory 10 in the scan sequence. This operation is carried out a number of times (M) determined from the field of vision detection and the scanning intervals which are preset. As a result, a video signal as shown in FIG. 4(a) is provided for the memory 11. However signals due to scales or water depositions (a) or radiated heat or scattered light (b) constituting external disturbance components as described with reference to the conventional device above are mixed with the video signal. Therefore, the video signal on the scanning line (c) is as shown in FIG. 4(b), for instance. Accordingly, binary-encoding with fixed threshold values (d or e) increases the error.

Figure 4C:
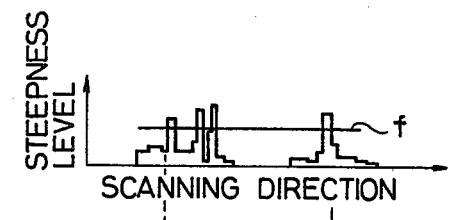
Figure 4D:
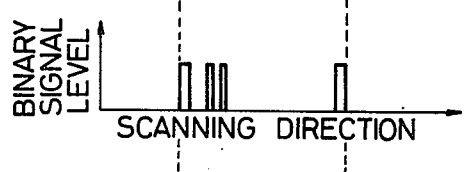

In the device of the invention, the video signal with such temperature levels is two-dimensionally differentiated in the differentiation circuit 12, so that a "steepness" level signal indicative of high slope regions as shown in FIG. 4(c) is obtained. That is, as is apparent from the video signal shown in FIG. 4(b), at the edge of the steel plate 1 there is a large change in the signal, while the signal corresponding to the scattered light does not greatly change.

Therefore, the edge and the scattered light can be readily distinguished from each other. The steepness level of the signal corresponding to the scale or water deposition is over a range which is so wide that the above-described edge and scattered light signals could not be distinguished, as shown in FIG. 4(c), however, this occurs only within the steel plate 1.

Figure 4E:
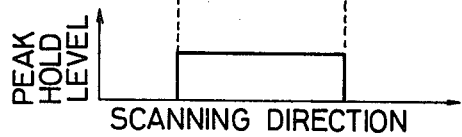

The signal of FIG. 4(c) is binary-encoded in the binary-encoding circuit 14 using a predetermined threshold level (f), and the resultant binary-encoded signal is subjected to peak-holding in the peak hold circuit 13, as a result of which a steel plate width signal as shown in FIG. 4(e), which is not-affected by scale or water deposition, is obtained.

A cutting signal is produced in response to the width signal, similarly as in the conventional device.

In the above-described embodiment, the binary-encoding circuit 14 operates to binary-encode the signal by referring to a fixed threshold value; however, in the case where the temperature of the steel plate changes greatly, it is sometimes difficult to set the threshold value.

Figure 5:
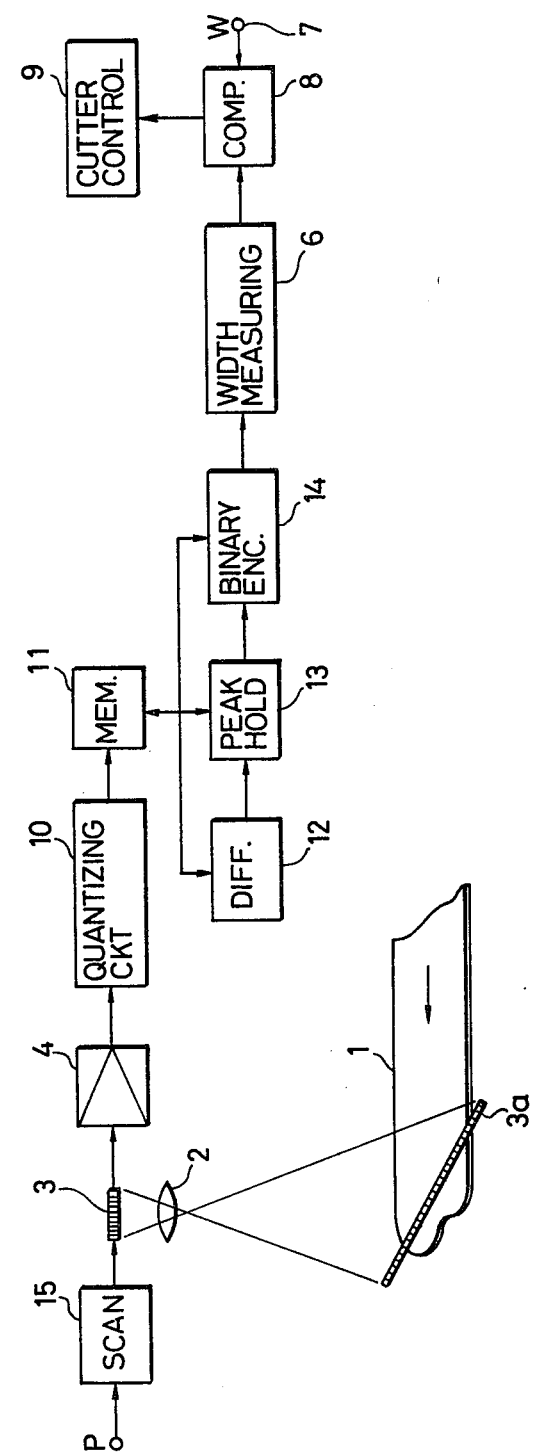
FIG. 5 is a block diagram showing a second embodiment of the invention.

This difficulty is overcome by a second embodiment of the invention, of which FIG. 5 is a block diagram. A "steepness" level signal is processed in a differentiation circuit 12 and is then subjected to peak-holding in a peak hold circuit 13. As a result, similarly as in the case of FIG. 4(c), a video signal as shown in FIG. 6(a) is stored as a peak-hold signal, as shown in FIG. 6(b), in a memory 11. In this case, the direction of peak-holding is set toward the central portion of the steel plate, as indicated by the arrows j and i in FIG. 6(b). Then, a temperature histogram signal is obtained from the peak-hold signal stored in the memory 11, by means of a binary-encoding circuit 14. FIG. 6(c) shows one example of the temperature histogram signal thus obtained. The N axis represents the frequency of occurrence and the V axis the video signal levels. In this case, a signal k corresponding to the steel plate and a signal l corresponding to the scattered heat or light are provided as the higher level parts of the temperature histogram signal. Therefore, a binary-encoded signal as shown in FIG. 6(d) can be obtained by binary-encoding the signal with a voltage according to a lower level part between the higher level parts of the histogram signal as a threshold value. Thus, in the second embodiment, a floating binary-encoding method in which the threshold value $V_1$ is determined according to the temperature of the steel plate is employed, and therefore the image of the steel plate can be stably detected. Similarly to the case of the conventional device, a cutting signal is produced in response to the width signal.

Figure 8A:
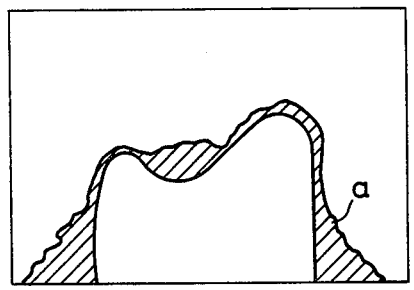
FIGS. 8(a)-8(c), 9 and 10 are diagrams for describing the operation of the device in FIG. 7.
Figure 8B:
Figure 8C:
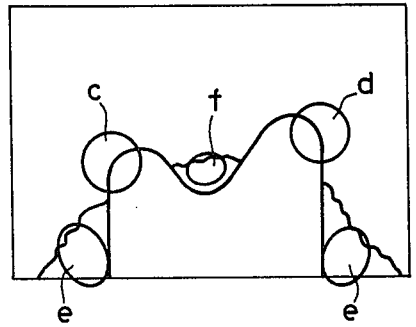
Figure 9:
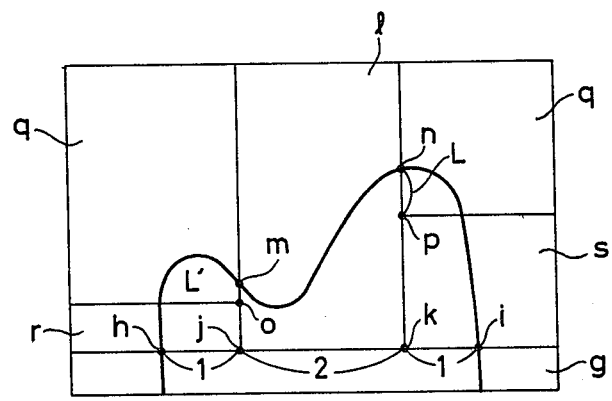
Figure 10:
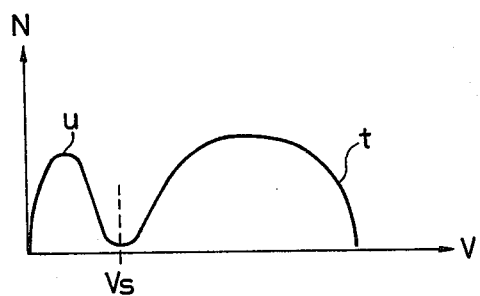

A further embodiment of this invention will now be described with reference to FIG. 7. In FIG. 7, reference numerals 1 through 9 designate elements which have been designated by the same reference numerals in FIG. 1; 10 is a quantizing circuit for quantizing an analog steel plate signal in multiple-levels; 11, a memory for storing a quantized steel plate signal; 12, a local binary-encoding circuit for (locally) reading a part of the steel plate signal stored in the memory 11, forming a histogram to obtain an optimum threshold value, and binary-encoding the signal thus read using the threshold value; and 15, a scanning circuit for scanning the group of photo-electric elements as in the FIG. 3 embodiment. The video signal is applied through the amplifier 4 to the quantizing circuit 10, where it is converted into a digital signal with multiple quantization-levels. The digital signal is stored in the memory 11 in the scan sequence. This operation is carried out a number of times (M) determined from the field of vision detection and the preset scanning intervals. As a result, a video signal as shown, for example, in FIG. 8(a) is provided for the memory 11. However, as indicated by the shaded portion in FIG. 8a, a signal due to scattered heat or light is mixed with the video signal. The signal is produced by light radiated from the red-hot steel plate 1, and the light intensity will vary with the temperature of the region. Therefore, scattered light corresponding to portions e and f in FIG. 8(c), i.e., high temperature portions of the steel plate 1, has a high signal level $V_1$. On the other hand, the steel plate 1 has lower temperature portions as indicated by reference characters c and d in FIG. 8(c). If, when the signal level $V_2$ of these portions is lower than the aforementioned signal level $V_1$, and if binary-encoding is effected by referring to a single fixed threshold value, errors are caused as indicated by the solid line in FIG. 8(b). In order to eliminate these errors, the binary-encoding circuit 14 consecutively reads the video signal corresponding to the different regions of the scanned area, and determines a threshold value for each region and encodes according to this value to obtain accurate boundary information for each region. In particular, the circuit 14 reads the video signal corresponding to the central portion of the steel plate 1 which is at high temperature, i.e., a region g in FIG. 9, out of the memory 11, to form a histogram. One example of the histogram is as shown in FIG. 10, in which the horizontal axis represents video signal levels V, and the vertical axis the frequencies N thereof. The region where the temperature is relatively high occupies most of the region g. Therefore, a steel plate section and a scattered light section can be clearly distinguished from each other on the histogram signal as indicated by reference characters t and u in FIG. 10. Therefore, the region g can be binary-encoded with high accuracy by employing as a threshold value a video signal level $V_S$ indicating the boundary between the two sections. The results of this binary-encoding threatment are again stored in the memory 11. Points h and i, which are the ends of the video image, can be obtained by the abovedescribed binary-encoding treatment. Points j and k, by which the width of the steel plate 1 is divided in a ratio of 1:2:1 are obtained on the video image in the line between h and i. Then, similarly as in the above-described case, a histogram is provided for the central region 1, in the widthwise direction, the temperature of which is relatively high, and a binary-encoding treatment is carried out by referring to the threshold value indicated by the histogram. The results of the binary-encoding treatment are stored in the memory 11.

In succession, points m and n of the video image can be obtained by the above-described treatment. Therefore, similarly, a histogram is formed for regions q low in temperature, which are the corners of the steel plate, by utilizing points o and p whose positions have been calculated from points m and n by using distances L and L', which are experimentally derived, and a binary-encoding treatment is carried out. The result of the binary-encoding treatment are stored in the memory. In this case, the regions are relatively low in temperature, but the steel plate section and the scattered light section can be distinguished from each other on the basis of the voltage value indicated by the histogram thereof. Similarly, a binary-encoding treatment is carried out for the remaining regions r and s, and the results of the binary-encoding treatment are stored in the memory 11. By binary-encoding the video image in a divided manner as described above, regions corresponding to the temperature distribution characteristic of the steel plate are obtained, and therefore the scattered heat or light sections and the steel plate sections can be clearly distinguished over the whole of the plate, whereby the binary-coding treatment includes no errors, and the video image thus binary-encoded is stored in the memory 11. The operation of producing the cutting signal as a result of the storage of the video image as described above is similar to that in the conventional device.

In the above-described embodiment, the minimum number of divisions of the video image required for the divided binary-encoding circuit is as indicated; however, the number of divisions may be increased according to the above-described concept.

In the above-described embodiments, the differentiation circuit, the peak hold circuit and the binary-encoding circuit have been described as hardware; however, their functions may be performed in a software mode by using a computer. Furthermore, various filters and an automatic aperture control may be added to the device so that the quantity of received light may be adjusted in the steel plate image pickup means.

As was described above, according to the invention, the video signal having the temperature and light level information is converted into a high slope or steepness level signal to eliminate signals corresponding to scales or water depositions. Therefore, the configuration detecting device according to the invention is immune to external disturbance components such as scales, water depositions and scattered heat or light, which are unavoidably involved in the hot rolling process. Thus, the device of the invention is considerably effective in practical use. Also according to the invention, the video image is divided into regions according to the temperature distribution characteristic of the steel plate, and a binary-encoding treatment is carried out using a threshold value obtained through the histogram process for every region. Therefore, the configuration detecting device of the invention is free from the effect of scattered heat or light.

What is claimed is:

1. A configurationn detecting device comprising;
   a detecting means for forming an image of an object and producing a scanning signal;
   scanning means for controlling a scanning interval of said detecting means according to a movement distance of said object;
   means for quantizing a detection signal provided by said detecting means in multiple-levels;
   memory means for storing a multi-level signal provided by said quantizing means;
   means for differentiating said multilevel signal stored in said memory means;
   means for binary-encoding a differentiation signal provided by said differentiating means;
   means for subjecting a binary-encoded signal provided by said binary-encoding means to peak-holding; and
   means for obtaining the width of a scanned portion of said object from a peak hold signal provided by said peak hold means.

2. A device as claimed in claim 1, further comprising means for comparing the width of a scanned portion with a reference value and providing an output signal according to the result of said comparison.

3. A device as claimed in claim 1, said object comprising a steel plate of high temperature.

4. A device as claimed in claim 1, said detecting means comprising a group of photoelectric elements.

5. A device as claimed in claim 1 wherein the means for differentiating differentiates said multi-level signal in two dimensions along an X axis and along a Y axis, respectively.

6. A configuration detecting device, comprising;
   detecting means for forming an image of an object with a group of photo-electric elements and producing a scanning signal corresponding to a temperature of said object;
   means for controlling a scanning interval of said detecting means according to a movement distance of said object;
   means for quantizing a detection signal provided by said detecting means in multiple-levels;
   memory means for storing a multiple-level signal provided by said quantizing means;
   means for differentiating said multiple-level signal stored in said memory means;
   means for subjecting a differentiation signal provided by said differentiating means to peak-holding;
   binary-encoding means for determining, from a temperature histogram, a threshold level for a peak hold signal provided by said peak hold means, and for binary-encoding said peak hold signal according to said threshold level; and
   width measuring means for obtaining the width of a scanned portion of said object from a binary-encoded signal provided by said binary-encoding means.

7. A device as claimed in claim 6, further including comparison means for comparing a width signal from said width measuring means and for producing a signal controlling cutting of said object.

8. A device as claimed in claim 6, said temperature histogram being prepared from data stored in said memory.

9. A device as claimed in claim 6 wherein the means for differentiating differentiates said multi-level signal in two dimensions along an X axis and along a Y axis, respectively.

10. A configuration detecting device, comprising;
detecting means for forming an image of an object, and producing a scanning signal in correspondence to a temperature of said object;
means for controlling a scanning interval of said detecting means according to a movement distance of said object;
memory means for storing a multiple-level signal provided by quantizing means adapted to quantize in multiple-levels a detection signal provided by said scanning means;
binary-encoding means for dividing the signal stored in said memory means into a plurality of signal parts corresponding to a plurality of regions of said object according to a temperature distribution of said object and for binary-encoding each of said signal parts using a threshold value which is obtained for each region;
width measuring means for obtaining the width of a scanned portion of said object from a binary-encoded signal provided by said binary-encoding means; and
comparison means for comparing said width signal from said width measuring means with a predetermined width value, and providing an output signal according to the result of the comparison.

11. A device as claimed in claim 10, wherein said stored signal divided into a plurality of parts has one part which corresponds to a region (g) said region (g) is obtained by dividing, in a width-wise direction, the central portion of said object which is at high temperature, into three regions including a central region (1) and two side regions on either side thereof, said three regions being obtained by division of said region (g) widthwise in a predetermined ratio, at least one of said side regions included in said three regions including a predetermined portion of the end portion of said object.

12. A device as claimed in claims 10 or 11, said object comprising a steel plate, said comparison output signal being supplied as a cutting signal for severing an end of said plate.

13. A device as claimed in claim 11, said binary-encoding means generating a temperature histogram for each said region, said threshold value being derived from said histograms.

* * * * *